(12) United States Patent
Tsay et al.

(10) Patent No.: US 7,810,783 B2
(45) Date of Patent: Oct. 12, 2010

(54) FASTENING STRUCTURE FOR STEERING WHEEL

(76) Inventors: Wen-Feng Tsay, P.O. Box 24-108, Taipei (TW); Wen Hong Shen, P.O. Box 24-108, Taipei (TW)

( * ) Notice: Subject to any disclaimer, the term of this patent is extended or adjusted under 35 U.S.C. 154(b) by 652 days.

(21) Appl. No.: 11/593,942

(22) Filed: Nov. 8, 2006

(65) Prior Publication Data

US 2008/0104803 A1    May 8, 2008

(51) Int. Cl.
*B60R 11/00* (2006.01)
(52) U.S. Cl. .................... 248/693; 248/690; 248/230.8; 224/276
(58) Field of Classification Search ........... 248/693, 248/74.3, 229.17, 222.8, 230.8; 224/276
See application file for complete search history.

(56) References Cited

U.S. PATENT DOCUMENTS 4,622,776 A * 11/1986 Pfaff ............................. 47/67
4,848,624 A * 7/1989 Clem ......................... 224/222
5,494,248 A * 2/1996 Pratt et al. ............... 248/311.2
5,913,466 A * 6/1999 Revels ........................ 224/421
5,941,434 A * 8/1999 Green ........................ 224/250
6,766,992 B1 * 7/2004 Parker ........................ 248/300
6,932,309 B1 * 8/2005 Corey et al. .............. 248/231.9
7,548,770 B2 * 6/2009 Tsai ......................... 455/575.9
2007/0029359 A1 * 2/2007 Smith ......................... 224/276
2007/0251963 A1 * 11/2007 Lin ............................. 224/276

* cited by examiner

*Primary Examiner*—J. Allen Shriver, II
*Assistant Examiner*—Steven M Marsh
(74) *Attorney, Agent, or Firm*—Jackson IPG PLLC; Demian K. Jackson

(57) ABSTRACT

A fastening structure for fastening a member to the rim of the steering wheel of a motor vehicle is disclosed to include a mounting base frame, which has two mounting holes at two distal ends for the mounting of an external member and two sets of hooks bilaterally protruded from the top wall between the mounting holes, and two elastic fastening belts, which have a hook hole one each of the respective two distal ends respectively hooked on the hooks at the mounting base frame to secure the mounting base frame to the rim of the steering wheel of the motor vehicle firmly in place.

2 Claims, 3 Drawing Sheets

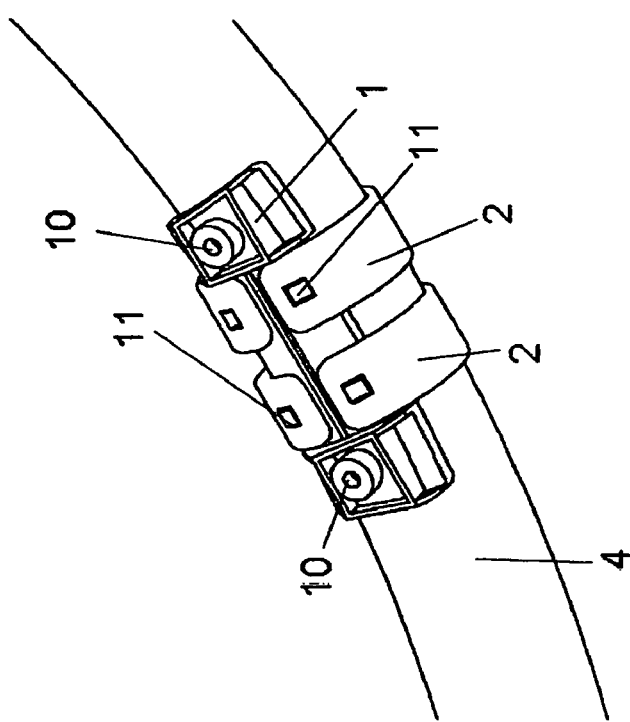
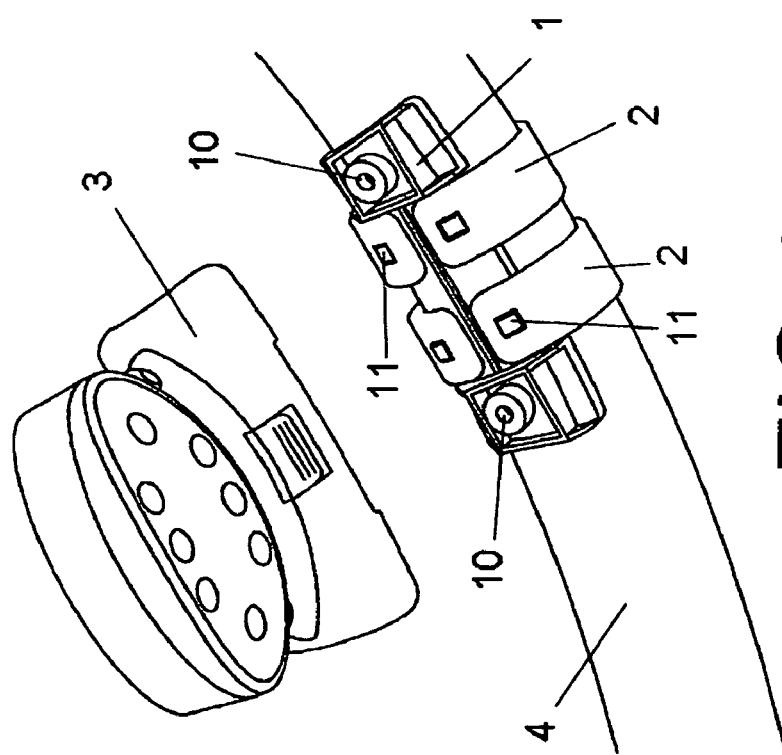

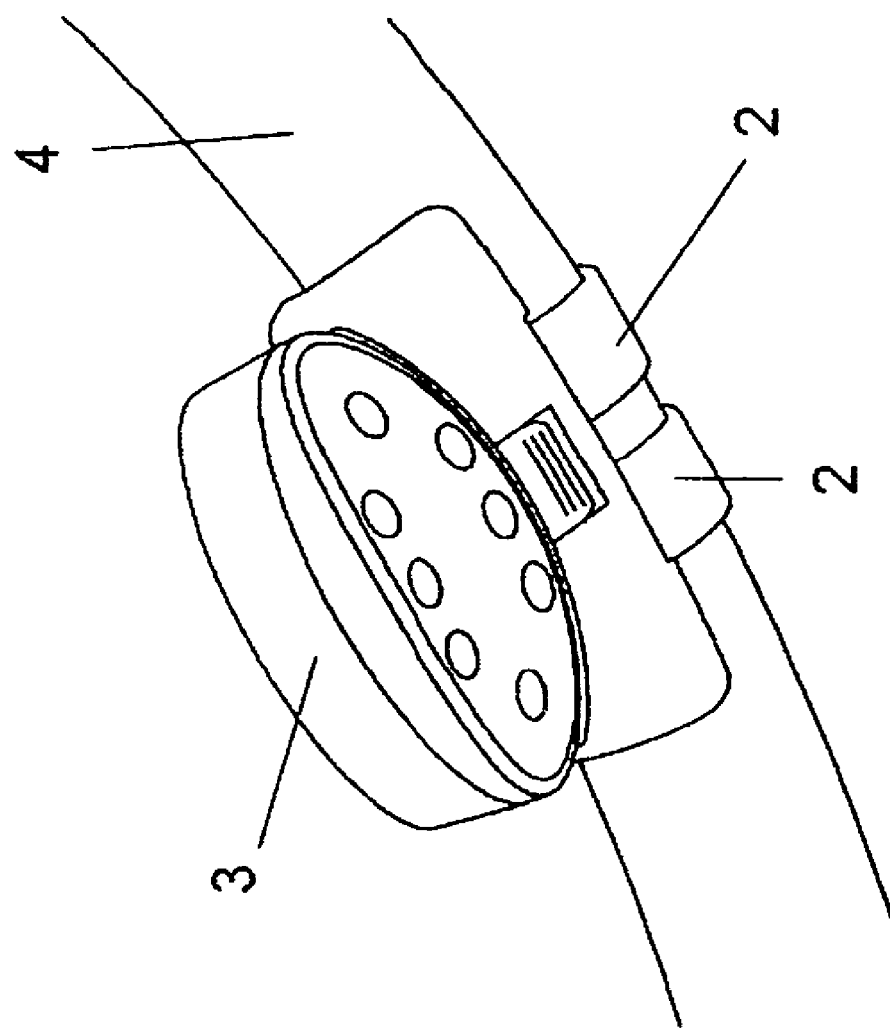

FASTENING STRUCTURE FOR STEERING WHEEL

BACKGROUND OF THE INVENTION

1. Field of the Invention

The present invention relates to a fastening structure for steering wheel and more particularly, to such a fastening structure, which uses elastic fastening belts to secure a mounting base frame to the rim of the steering wheel of a motor vehicle for holding a product.

2. Description of the Related Art

In the limited space inside a car, the driver may attach small items to the steering wheel or the column of the steering wheel. However, it is difficult to conveniently positively secure an article to the steering wheel or the column of the steering wheel.

Therefore, it is desirable to provide a fastening structure for steering wheel that can conveniently and detachably fastened to the rim or steering column of a vehicle steering wheel to secure a product positively in use.

SUMMARY OF THE INVENTION

The present invention has been accomplished under the circumstances in view. It is the main object of the present invention to provide a fastening structure, which can easily and detachably fastened to the rim of the steering wheel of a motor vehicle to secure a member to the steering wheel firmly. According to the present invention, a mounting base frame is sued for holding the member to be secured to the steering wheel, and two elastic bands are hooked on the mounting base frame to secure the mounting base frame firmly to the rim of the steering wheel.

BRIEF DESCRIPTION OF THE DRAWINGS

FIG. 3 is an installed view of the present invention, showing the fastening structure fastened to the rim of a vehicle steering wheel.

FIG. 4 is an exploded view showing an application example of the present invention.

FIG. 5 is an installed view of FIG. 4.

DETAILED DESCRIPTION OF THE INVENTION

Figure 1:
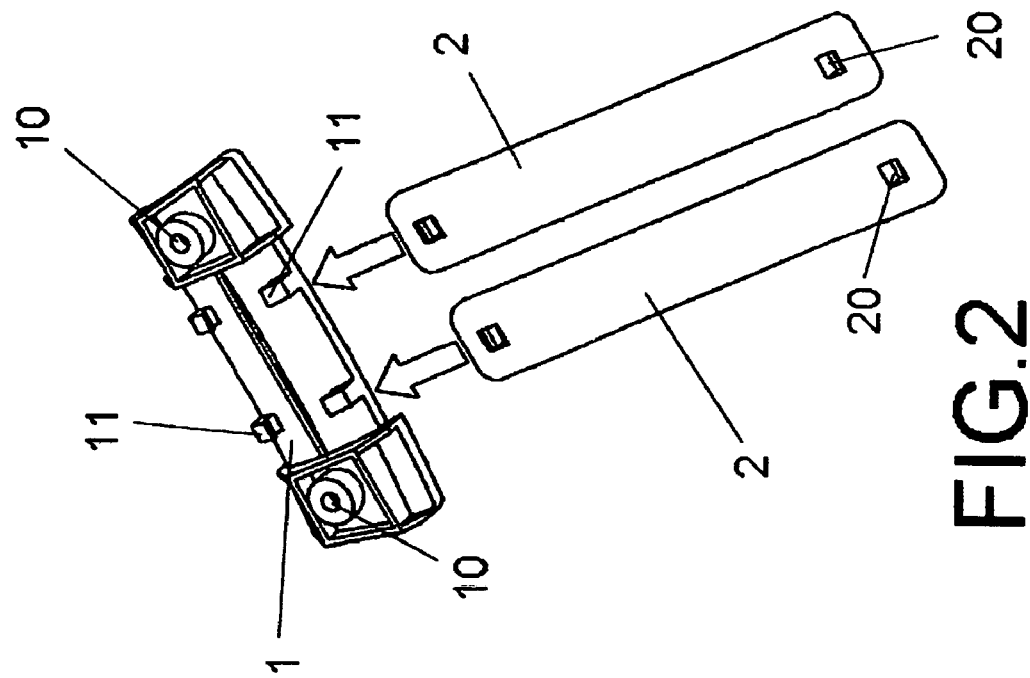
FIG. 1 is an elevational extended-out view of a fastening structure for steering wheel in accordance with the present invention.
Figure 2:
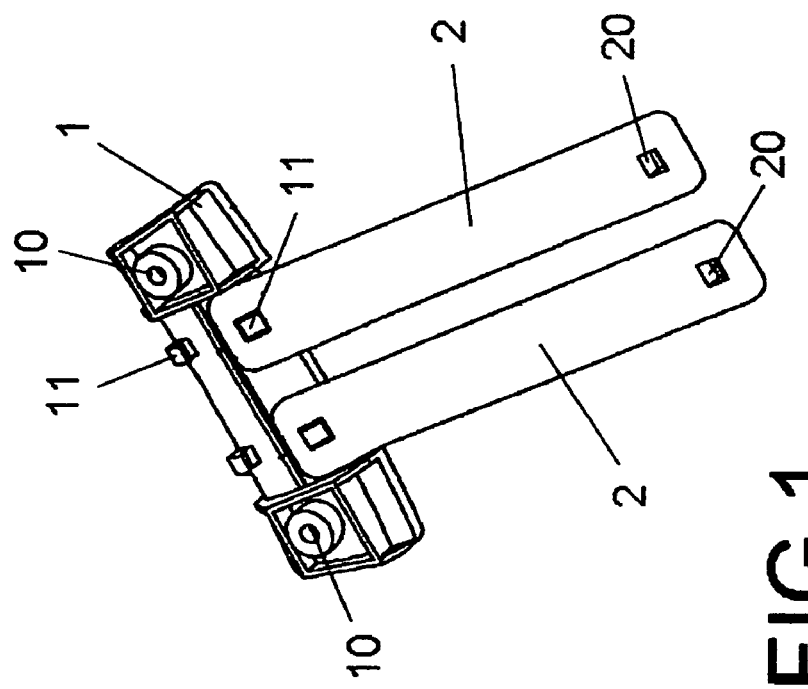
FIG. 2 is an exploded view of the fastening structure for steering wheel in accordance with the present invention.

Referring to FIGS. 1 and 2, a fastening structure is shown comprised of a mounting base frame 1, and two elastic fastening belts 2.

The mounting base frame 1 has two mounting holes 10 respectively disposed at the two distal ends for the mounting of a product 3, and two sets of hooks 11 bilaterally protruded from the top wall between the mounting holes 10 for securing the elastic fastening belts 2. The elastic fastening belts 2 can be made out of rubber or silicon rubber, each having a hook hole 20 on each of the two distal ends.

Referring to 3~5, during installation, the mounting base frame 1 is attached to the rim 4 of a vehicle steel wheel, and then the elastic fastening belts 2 is extending over the periphery of the rim 4 of the vehicle steering wheel with the hook holes 20 respectively fastened to the hooks 11 to secure the mounting base frame 1 firmly to the rim 4 of the vehicle steering wheel (see FIG. 3), and then the product 2 to be carried on the rim 4 of the vehicle steering wheel is affixed to the mounting holes 10 of the mounting base frame 1 with fastening members, for example, screws.

A prototype of fastening structure for steering wheel has been constructed with the features of FIGS. 1~5. The fastening structure for steering wheel functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A fastening structure comprising:
   a mounting base frame, said mounting base frame comprising two mounting members respectively disposed at two distal ends thereof for the mounting of an external member, a first sets of hooks and a second set of hooks bilaterally protruded from a top wall between said mounting members, each hook of said first and said second sets of hooks respectively having an upper extension extending directly over an upper surface of said mounting base frame to form a gap between each respective upper extension and said upper surface of said mounting base frame; and
   a plurality of elastic fastening belts for securing said mounting base frame to the rim of a vehicle steering wheel, said elastic fastening belts each having a first end provided with a first hook hole extending through each of said belts for fastening to said first set of hooks and a second end provided with a second hook hole extending through each of said belts for fastening to said second set of hooks,
   wherein each gap of said first and said second sets of hooks faces a central lengthwise extending axis of said mounting base frame.

2. The fastening structure as claimed in claim 1, wherein said mounting members of said mounting base frame are mounting holes.

* * * * *